United States Patent [19]

Butler

[11] Patent Number: 5,109,095
[45] Date of Patent: Apr. 28, 1992

[54] SILOXANE RESINS AND METHOD FOR MAKING THEM

[75] Inventor: Derek W. Butler, Barry, United Kingdom

[73] Assignee: Dow Corning Limited, Barry, Wales

[21] Appl. No.: 483,523

[22] Filed: Feb. 22, 1990

[30] Foreign Application Priority Data

Mar. 22, 1989 [GB] United Kingdom ............... 8906627

[51] Int. Cl.$^5$ .............................................. C08G 77/06
[52] U.S. Cl. ...................................... 528/15; 528/31; 528/32; 528/39; 556/462; 556/450; 556/455
[58] Field of Search ............... 528/31, 32, 39, 15; 556/462, 450, 455

[56] References Cited

U.S. PATENT DOCUMENTS

| | | | |
|---|---|---|---|
| 3,036,985 | 5/1962 | Daudt | 260/42 |
| 3,772,247 | 11/1973 | Flannigan | 260/46.5 H |
| 4,485,130 | 11/1984 | Lampin et al. | 528/39 |
| 4,577,523 | 3/1986 | Groenhof | 556/455 |
| 4,707,531 | 11/1987 | Shirahata | 556/462 |

FOREIGN PATENT DOCUMENTS 706719 4/1954 United Kingdom.
1359024 7/1974 United Kingdom.

*Primary Examiner*—John C. Bleutge
*Assistant Examiner*—Karen A. Hellender
*Attorney, Agent, or Firm*—Roger H. Borrousch

[57] ABSTRACT

Liquid organosiloxane MTQ resins of the general formula $[M_xT_yQ_z]_n$ wherein M denotes a monofunctional, T a trifunctional and Q denotes a tetrafunctional siloxane unit is characterized by the fact that n has an average value of from 4 to 14, $x+y$ is not less than z and not more than 2z and $x/y$ has a value of from 2/1 to 9/1. The resin molecule has at least one reactive substituent as defined and can be made by a method comprising (I) adding together a tetraalkoxysiloxane, a monoorganosilane and a triorganosilane or hexaorganodisiloxane in an acidified aqueous medium provided the tetraalkoxysilane is not added to the aqueous medium prior to the other components, (II) allowing the components to react together in said aqueous medium and, optionally (III) further reacting the finished resin with another compound having N atoms.

17 Claims, No Drawings

SILOXANE RESINS AND METHOD FOR MAKING THEM

This invention relates to siloxane resins, and more specifically to certain siloxane resins having mono-, tri- and tetra- functional units, hereinafter referred to as MTQ resins. The invention also relates to a method for making these resins.

Organosiloxane resins having mono-, tri- and tetra- functional siloxane units are known and have been described for example in British Patent Specifications 706 719, 783 867 and 1 359 024. The functionality of the siloxane groups refers to the number of silicon bonds which are formed or formable through silicon-oxygen bonds. In the first of these specifications siloxane resins are prepared by reacting one or more silanes and/or one or more siloxanes with a silica hydrosol. Most of these resins are solid but some of the resulting materials described are liquid copolymers. In Examples 7 and 8 resins are described which are viscous liquids being a copolymer of trimethylsiloxane, monophenylsiloxane and $SiO_2$ units and of trimethylsiloxane, monostearylsiloxane and $SiO_2$ units respectively. In the second of these specifications, the resins are described as finely divided solid organosilicon compounds which are used as fillers for optically clear organopolysiloxane elastomer compositions. They are manufactured by preparing a silica co-hydrogel from e.g. sodium silicate and a monoorganosiloxane salt, and reacting the co-hydrogel with a siloxane in an acidic medium. The last of the specifications mentioned above provides profoamers which are copolymers consisting of $R_3SiO_{\frac{1}{2}}$ units, $RSiO_{3/2}$ units and $SiO_2$ units wherein R is an alkyl radical, a monocyclic aryl hydrocarbon radical, an alkaryl radical or an aralkyl radical, the ratio of monofunctional units to the total of tri- and tetrafunctional units combined is from 0.6/1 to 1.5/1 and the ratio of said trifunctional units to said tetrafunctional units is from 0.05/1 to 1/1. All exemplified compounds are soluble in xylene. Preparation methods described in this specification include the cohydrolysis of a mixture of $R_3SiX$, $RSiX_3$ and $SiX_4$ wherein R is as described above and X is a hydrolysable group, halogen being the only one disclosed; addition of a blend of $R_3SiX$ and $RSiX_3$ to a stabilised hydrosol, and the addition of a solution of $R_3SiX$ to a stabilised hydrosol of silica and methylsiliconic acid. In U.S. Pat. No. 3,772,247 organopolysiloxane MTQ resins are described, e.g. in Examples 4, 5 and 6. The resins are described as brittle solids. The method of making them is as described in G.B. 706 719. U.S. Pat. No. 3,772,247, however, also mentions as alternative methods the cohydrolysis described in G.B. 1 359 024 and the hydrolysis of a solvent solution of a triorganoalkoxysilane, a trialkoxysilane and a tetraalkoxysilane. The latter two methods are not exemplified.

The resins described above are mainly solid resins at room temperature. There remains a need for resins which are liquid at temperatures around and slightly above ambient temperatures, especially resins which have groups attached to them which are able to react further or give a specific functionality to the resin. Such groups will be further referred to in this specification as reactive groups and include e.g. SiH, alkenyl, amino, thio, phosphate, ketone, acid and alcohol groups.

We have now found that novel MTQ resins, which are liquid at 50° C. and have a reactive group attached to them, can be prepared.

According to the present invention there are provided organosiloxane resins which are liquid at 50° C. at a pressure of $10^5$ Pa and have the general formula $[M_xT_yQ_z]_n$, wherein M denotes a monofunctional siloxane unit of the formula $R'_aR_{3-a}SiO_{\frac{1}{2}}$ wherein a has a value of from 0 to 3, T denotes a trifunctional siloxane unit of the general formula $R''SiO_{3/2}$ and Q denotes a tetrafunctional unit of the general formula $SiO_{4/2}$, wherein R represents a saturated aliphatic hydrocarbon or an aromatic hydrocarbon group, R' denotes hydrogen, an olefinically or acetylenically unsaturated hydrocarbon substitutent, a substituted hydrocarbon or an organic substituent linked to silicon via a silicon-carbon bond and having O and/or N, S or P atoms present, R'' denotes a group R or a group R', there being at least one group R' per organosiloxane resin molecule, n has an average value of from 4 to 14 and x, y and z have values such that $x+y$ is not less than z and not more than 2z and that x/y has a value of from 2/1 to 9/1.

In the MTQ resins of the invention each R group may independently be an alkyl, aralkyl, alkaryl or aryl group, e.g. propyl, butyl, hexyl or phenyl. Preferably, however, substantially all R groups are lower alkyl groups, most preferably methyl groups. The R' group, or reactive group, is selected from the group including hydrogen, a hydrocarbon group which is olefinically or acetylenically unsaturated, for example alkenyl, e.g. vinyl, allyl and hexenyl or alkynyl, e.g. ethynyl and propargyl, chloropropyl and trifluoropropyl. R' may also be an organic substituent linked to silicon via a silicon-carbon bond and having O, N, S or P atoms in the substituent, e.g. those having $\equiv COH$ groups present, e.g. $-(CH_2)_3OH$, $(CH_2)_2(OCH_2CH_2)_8OH$ and $-CH_2-C(CH_3)-CH_2OH$, those having acrylic groups present, e.g. methacryloxypropyl and acryloxypropyl, those having aldehyde, ketone or acid groups present, those having thio groups present, e.g. mercaptopropyl, those with sulfonic acid groups present, those with phosphonic acid groups present and those having amino, amido, amine oxide, ammonium, imide or imine oxide groups present. Preferably R' is hydrogen, an alkenyl or substituted alkyl group or an organic group having an acrylic, amino or thio group present. R'' may be R if a has a value which is not 0. This means that the resin must have at least one group as defined for R' present per molecule. It is however preferred that a has a value of 0, and therefore R'' denotes a group R'.

The liquid state of the resins of the invention at 50° C. at a pressure of $10^5$ Pa arises from the above specified proportions and number of the different siloxane units. It is believed to be determined at least to some extent by the structure of the resin molecules. The applicant believes, but does not wich to be bound by this, that the structure of the resins of this invention is based on a core of Q units, which is surrounded by M and T units, thus differing from a more open structure of solid MTQ resins. The exact molecular weight is determined by the desired proportions of the siloxane units of the resin. The value of $x+y$ has to be not less than z and not more than 2z. Resins wherein the value of $x+y$ is lower than z are solid materials, often having an open structure and having a largely superior molecular weight than the resins of this invention, while values above 2z tend to give a material which has a very low molecular weight, and are believed to yield resins which do not have the desired structure. The ratio of x/y has a value of from 2/1 to 9/1. Preferably this ratio is in the range 3/1 to 5/1. The average value of n is from 4 to 14. Values below about 4 are usually only obtained when resins are produced wherein the x+y is larger than 2z, while values above about 14 tend to yield solid resins.

The liquid resins of the invention are very useful as fillers in elastomer-forming compositions, as materials providing a coating or as precursors for further reaction with other compounds.

Resins of the invention may be prepared by reacting together tetrafunctional alkoxysilanes, trifunctional silanes and monofunctional silanes or disiloxanes in an acidic aqueous medium.

According to another aspect of the present invention there is provided a method for making organosiloxane resins which are liquid at 50° C. at a pressure of $10^5$ Pa and have the general formula $[M_xT_yQ_z]_n$, wherein M denotes a monofunctional siloxane unit of the formula $R'_aR_{3-a}SiO_{\frac{1}{2}}$ wherein a has a value of from 0 to 3, T denotes a trifunctional siloxane unit of the general formula $R''SiO_{3/2}$ and Q denotes a tetrafunctional unit of the general formula $SiO_{4/2}$, wherein R represents a saturated aliphatic hydrocarbon or aromatic hydrocarbon group, R' denotes hydrogen, an olefinically or acetylenically unsaturated hydrocarbon substituent, a substituted hydrocarbon or an organic substituent linked to silicon via a silicon-carbon bond and having O and/or N, P or S atoms present, R'' denotes a group R or R', there being at least one group R' per organosiloxane resin molecule, n has an average value of from 4 to 14 and x, y and z have values such that x+y is not less than z and not more than 2z and that the ratio of x over y has a value of from 2 to 9, which comprises (I) adding together z molar parts of (A) a silane of the general formula $SiZ_4$, y molar parts of (B) a silane of the general formula $R^2SiY_3$ and either x molar parts of (C) a silane of the formula $R^3{}_aR_{3-a}SiX$ or x/2 molar parts of (C') a disiloxane of the formula $(R^3{}_aR_{3-a}Si)_2O$ in an aqueous medium, wherein $R^2$ and $R^3$ respectively denote R'' and R' except for the organic substituent having N atoms, X denotes a halogen or alkoxy group, Y denotes X or a group of the general formula $—OSiR_3$ and Z denotes an alkoxy group provided that Component (A) is not added to the aqueous medium prior to Components (B) and (C) or C'), (II) allowing Components (A), (B) and (C) or (C') to react together in said aqueous medium, the medium having a pH below 7, and (III) optionally further reacting the finished resin with another compound having N atoms. With the expression "molar parts" as used herein is meant that the components are added in such amounts that their molar ratio corresponds to the ratio of the number of M, T and Q units present in the organosiloxane MTQ resin molecule. In other words adding z molar parts of (A), y molar parts of (B) and x molar parts of (C) means that the molar ratio of (A)/(B)/(C) in the amounts added is equal to the ratio of z/y/x.

In the method of the invention there is used as Component (A) a silane of the formula $SiZ_4$, wherein each Z independently denotes any alkoxy group, preferably a lower alkoxy group, most preferably having 2 to 4 carbon atoms, e.g. ethoxy and n-propoxy groups. Most preferred is tetraethoxy silane. These silanes, also called orthosilicates are well known in the art and are commercially available materials. Preferred Components (A) include tetraethylorthosilicate (tetraethoxysilane), n-propylorthosilicate (tetrapropoxysilane) and tetrabutylorthosilicate (tetrabutoxysilane).

Component (B) is a trifunctional silane having three Y groups linked to the silicon atom and one group $R^2$.

$R^2$ is as defined above and includes such groups as described for R'' above, apart form the N containing organic substituents. Preferred are those compounds where $R^2$ is hydrogen, alkenyl or substituted alkyl group or an organic group having an acrylic or thio group present. The group Y in Component (B) is alkoxy, preferably methoxy or ethoxy, a halogen, preferably a chlorine atom or a group of the formula $—OSiR_3$, wherein R is as defined above and is preferably a methyl group. Examples of Component (B) therefore include methyltrimethoxy silane, triethoxysilane, vinyltrichloro silane, phenyltrimethoxy silane, allyltriethoxy silane, methacryloxypropyl trichloro silane, mercaptopropyl triethoxy silane, γ-chloropropyl trimethoxy silane, trifluoropropyl trichloro silane and vinyltris (trimethylsiloxy) silane.

Components (C) and (C') for use in the method of the invention are respectively monofunctional silanes and disiloxanes. The non-functional silicon-bonded substituents may be an unsaturated aliphatic or an aromatic hydrocarbon group R, reactive groups described above as $R^3$ or a mixture of R and $R^3$ groups. It is, however, preferred that the value of a equals zero and all substituents are therefore R groups. Preferably all R groups are lower alkyl groups, most preferably methyl groups. X may be an alkoxy group or a halogen group, preferably methoxy, ethoxy or chlorine. Examples of materials which may be used as Component (C) are trimethylchlorosilane, triphenylchlorosilane, trimethylmethoxysilane, dimethylchlorosilane, glycidoxypropyldimethyl methoxysilane and phenyldimethylchlorosilane. It is preferred to use Component (C') which is most preferably hexamethyldisiloxane.

The method of the invention is carried out in an aqueous medium, which has a pH below 7. The medium may either be made acidic by the addition of an acid, preferably a Broensted acid, most preferably hydrochloric acid, or it may be made acidic due to the hydrolysis of some of the components used in the method of the invention. The latter will happen e.g. if Y and/or X in Components (B) and (C) are chlorine atoms. In the presence of water, these components will hydrolyse and form HCl in the medium. If X in Component (C) and Y in Component (B) is e.g. a chlorine atom, no acidification of the medium may be required. Even if X in Component (C) would be e.g. a methoxy group sufficient acidification may take place by adding Component (B) if Y is a chlorine atom. However, additional acid is preferably added. When Component (C') is used, it is important to acidify the medium with an acid. If X and Y of Components (B) and (C) are both chlorine atoms, it is possible to add Component (A) at the same time as (B) and (C) to the reaction mixture.

In stage (I) of the method of the invention, it is important that Component (A) is not added to the aqueous medium before Components (B), (C) or (C'). Component (A) may be added simultaneously with or subsequently to either or both of Components (B) and (C) or (C'). It is preferred to disperse the Component (C) or (C') in the aqueous medium, before a mixture of Components (A) and (B) is gradually added. This method encourages the formation of the resins of the invention in such way that they have the correct structure to be liquid. However, Component (B) may be added to the dispersion of Component (C) or (C') prior to the addition of Component (A). The addition of Component (A) prior to either or both of Components (B) and (C) or (C') would result in a resin which has a structure which favours the formation of solids. Unless both X and Y are halogen atoms it is preferred that Component (A) is added subsequently to the addition of either or both of Components (B) and (C) or (C').

The reaction in stage (II) of the method of the invention between components (A), (B) and (C) occurs as a result of the hydrolysis of the components and the subsequent condensation of the thus formed silanol groups in the acidic medium according to the known reaction

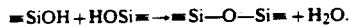

$$\equiv SiOH + HOSi\equiv \longrightarrow \equiv Si-O-Si\equiv + H_2O.$$

However, in view of the presence of Component (A), which upon hydrolysis forms a highly reactive compound of the formula $Si(OH)_4$, it is recommended to add an alcohol in order to reduce the hydrolysis rate of Component (A), thus reducing the danger of premature condensation of the components and the possible formation of gel particles. Suitable alcohols for this purpose include ethanol and isopropanol, the choice of alcohol being preferably the corresponding alcohol of the alkoxy group present as substituent Z. Preferably ethanol is used in combination with as preferred Component (A) tetraethoxysilane. The reaction between the components is preferably accelerated by reacting them at an elevated temperature, preferably around the reflux temperature of the dispersion, e.g. 50° to 75° C.

In order to make a resin where R' is an organic substituent having N atoms, in step (III) of the method of the invention, e.g. a resin in which R' is a hydrogen atom, may be further reacted with a compound having olefinic unsaturation as well as N atoms, e.g. as amino groups, e.g. allylamine, in the presence of a catalyst which catalyses the hydrosilylation reaction, e.g. a Pt compound or complex. Step (III) of the method is recommended as the amino groups would not be stable in the aqueous acidic medium in which the steps (I) and (II) of the method of the invention are carried out.

The resins produced by the method are recovered by standard methods, for example phase separation, washing, solvent extraction, distillation and drying. Step (III) is preferably only carried out after the resin of step (II) has been suitably recovered.

Making resins by the method of the invention allows one to make them in a very reproducible way, and to obtain resins which have a comparatively narrow range of molecular weight. This was not possible using methods of the prior art.

There now follow a number of examples which illustrate the invention, in which Me denotes a methyl group, Ph a phenyl group and Vi a vinyl group and in which all parts and percentages are expressed by weight unless otherwise stated.

EXAMPLE 1

To a flask fitted with agitator and condenser 40 g of concentrated hydrochloric acid were charged together with 30 g of ethanol (95% v/v) and 60 g of distilled water. The flask was kept under a nitrogen blanket and 113.4 g (0.7 mole) of hexamethyldisiloxane was added. The mixture was heated to 50° C. for 20 minutes, at which time a mixture of 208.4 g (1 mole) of tetraethoxysilane and 104.6 g (0.4 mole) of methacryloxypropyl trichlorosilane was added slowly over a period of 90 minutes. During the addition the temperature in the mixture rose to 68° C. When all the ingredients were added, the mixture was maintained between 64° to 69° C. for an extra hour. The organosiloxane resin was separated when the mixture was cooled. It was washed with distilled water and dried over $MgSO_4$. After filtration the mixture was stripped of volatile components at 100° C. and a pressure of 2 mbar. A pale straw coloured liquor was obtained, which had a viscosity at 25° C. of 1059.7 mm²/s and consisted of units of the formula $SiO_{4/2}$, $Me_3SiO_{\frac{1}{2}}$ and $CH_2=C(Me)OCO(CH_2)_3SiO_{3/2}$. When repeating the procedure twice, materials having a viscosity of 1091 and 714.9 mm²/s were obtained respectively.

EXAMPLE 2

To a flask fitted with agitator and condenser 20 g of concentrated hydrochloric acid were charged together with 15 g of ethanol (95% v/v) and 30 g of distilled water. The flask was kept under a nitrogen blanket and 64.8 g (0.4 mole) of hexamethyldisiloxane was added. The mixture was heated to 75° C. at which point a gentle reflux was observed. At this time a mixture of 104.2 g (0.5 mole) of tetraethoxysilane and 31.2 g (0.2 mole) of vinyltrichlorosilane was added slowly over a period of about 180 minutes. During the addition the temperature in the mixture rose to 85° C. When all the ingredients were added, the mixture was maintained at 85° C. for an extra two hours. The organosiloxane resin was separated when the mixture was cooled. It was washed with distilled water and then extracted with toluene. After another washing in distilled water, the resin containing phase was dried over $NaHCO_3$/$MgSO_4$. After filtration the mixture was stripped of volatile components at 130° C. and a pressure of 20 mbar. A water white liquor was obtained, which had a viscosity at 25° C. of 326.2 mm²/s. The resin consisted of the units $SiO_{4/2}$, $Me_3SiO_{\frac{1}{2}}$ and $ViSiO_{3/2}$. When repeating the procedure material having a viscosity of 292.7 mm²/s and 404.7 mm²/s were obtained. The Vi content was respectively 4.7, 4.8 and 4.6%.

EXAMPLE 3

The procedure of example 2 was repeated four times, except for the fact that no HCl was added. Materials with a viscosity of 175.7, 175.9, 155 and 148.7 mm²/s respectively were obtained, having a respective vinyl content of 5.38, 5.29, 5.41 and 5.37%.

EXAMPLE 4

The procedure of Example 2 was repeated twice, except that $ViSiCl_3$ was replaced by $ViSi(OCH_2CH_3)_3$, which was added over a period of 2 hours. The resulting resing had a viscosity of 1077 and 901.8 mm²/s and a vinyl content of 4.54 and 4.56% respectively.

EXAMPLE 5

The procedure of Example 2 was repeated 3 times, except that the amount of hexamethyldisiloxane was reduced to three quarters and the $ViSiCl_3$ was replaced by $ViSi(OSiMe_3)_3$. The resin obtained had a viscosity of 97, 114.8 and 104.4 mm²/s respectively and a vinyl content of 3.79, 3.73 and 3.71% respectively.

EXAMPLE 6

To a flask fitted with agitator and condenser 120 g of concentrated hydrochloric acid were charged together with 90 g of ethanol (95% v/v) and 180 g of distilled water. The flask was kept under a nitrogen blanket and 340.2 g (2.1 mole) of hexamethyldisiloxane was added. The mixture was heated to 70° C. over 35 minutes, at which time a mixture of 624.9 g (3 mole) of tetraethoxysilane and 199.8 g (1.2 mole) of Cl(CH$_2$)$_3$Si(OCH$_3$)$_3$ was added slowly over a period of 140 minutes. During the addition the temperature in the mixture rose to 76° C., which was maintained for two hours. The organosiloxane resin was separated when the mixture was cooled. It was washed with distilled water and dried over MgSO$_4$. After filtration the mixture was stripped of volatile components at 130° C. and a pressure of 24 mbar. 579.1 g (85.7% yield) of a resin was obtained, which had a viscosity at 25° C. of 2525.4 mm$^2$/s and a molecular weight of 995.4. The resin consisted of units of the formula SiO$_{4/2}$, Me$_3$SiO$_{\frac{1}{2}}$ and Cl(CH$_2$)$_3$SiO$_{3/2}$. When repeating the procedure twice, materials having a viscosity of 2619 and 1553 mm$^2$/s and a molecular weight of 949.49 and 954.77 respectively were obtained.

EXAMPLE 7

To a flask fitted with agitator and condenser 20 g of concentrated hydrochloric acid were charged together with 15 g of ethanol (95% v/v) and 30 g of distilled water. The flask was kept under a nitrogen blanket and 64.8 g (0.4 mole) of hexamethyldisiloxane was added. To the mixture was added at a temperature of 15° C. a mixture of 104.2 g (0.5 mole) of tetraethoxysilane and 27.1 g (0.2 mole) of HSiCl$_3$ was added slowly over a period of 165 minutes. During the addition the temperature in the mixture rose to 30° C. The organosiloxane resin was separated, washed with distilled water and dried over MgSO$_4$. After filtration the mixture was stripped of volatile components at 100° C. and a pressure of 2 mbar. A viscous liquor was obtained, which had a viscosity at 25° C. of 1802.3 mm$^2$/s and a SiH content of 2.59%. The resin consisted of units of the formula SiO$_{4/2}$, Me$_3$SiO$_{\frac{1}{2}}$ and HSiO$_{3/2}$.

That which is claimed is:

1. Organosiloxane resins which are liquid at 50° C. at a pressure of $10^5$ Pa and have the general formula $[M_xT_yQ_z]_n$, wherein M denotes a monofunctional siloxane unit of the formula R'$_a$R$_{3-a}$SiO$_{\frac{1}{2}}$ wherein a has a value of from 0 to 3, T denotes a trifunctional siloxane unit of the general formula R''SiO$_{3/2}$ and Q denotes a tetrafunctional siloxane unit of the general formula SiO$_{4/2}$, wherein R is selected from the group consisting of saturated aliphatic and aromatic hydrocarbon substituents, R' is selected from the group consisting of hydrogen, olefinically or acetylenically unsaturated hydrocarbon substituents, chloropropyl, trifluoropropyl, organic substituents linked to silicon via a silicon-carbon bond and having oxygen present, organic substituents linked to silicon via a silicon-carbon bond and having nitrogen present, organic substituents linked to silicon via a silicon-carbon bond and having sulfur present, organic substituents linked to silicon via a silicon-carbon bond and having oxygen and nitrogen present, organic substituents linked to silicon via a silicon-carbon bond and having oxygen and sulfur present, and organic substituents linked to silicon via a silicon-carbon bond and having oxygen and phosphorous present, R'' denotes a group R or a group R', there being at least one group R' per organosiloxane resin molecule, n has an average value of from 4 to 14 and x, y, and z have values such that x+y is not less than z and not more than 2z and that the ratio of x to y has a value of from 2/1 to 9/1.

2. Organosiloxane resins according to claim 1 wherein a is zero.

3. Organosiloxane resins according to claim 1 wherein substantially all R groups are methyl groups.

4. Organosiloxane resins according to claim 1 wherein R' when present and R'' is selected from the group consisting of hydrogen, alkenyl groups, substituted alkyl groups, organic substituents having an acrylic group present, organic substituents having an amino group present and organic substituents having a thio group present.

5. Organosiloxane resins according to claim 1 wherein the ratio of x/y is from 3/1 to 5/1.

6. A method for making organosiloxane resins which are liquid at 50° C. at a pressure of $10^5$ Pa and have the general formula $[M_xT_yQ_z]_n$, wherein M denotes a monofunctional siloxane unit of the formula R'$_a$R$_{3-a}$SiO$_{\frac{1}{2}}$ wherein a has a value of from 0 to 3, T denotes a trifunctional siloxane unit of the general formula R''SiO$_{3/2}$ and Q denotes a tetrafunctional siloxane unit of the general formula SiO$_{4/2}$, wherein R is selected from the group consisting of saturated aliphatic and aromatic hydrocarbon substituents, R' is selected from the group consisting of hydrogen, olefinically or acetylenically unsaturated hydrocarbon substituents, chloropropyl, trifluoropropyl, organic substituents linked to silicon via a silicon-carbon bond and having oxygen present, organic substituents linked to silicon via a silicon-carbon bond and having nitrogen present, organic substituents linked to silicon via a silicon-carbon bond and having sulfur present, organic substituents linked to silicon via a silicon-carbon bond and having oxygen and nitrogen present, organic substituents linked to silicon via a silicon-carbon bond and having oxygen and sulfur present, and organic substituents linked to silicon via a silicon-carbon bond and having oxygen and phosphorous present, R'' denotes a group R or a group R', there being at least one group R' per organosiloxane resin molecule, n has an average value of from 4 to 14 and x, y, and z have values such that x+y is not less than z and not more than 2z and that the ratio of x to y has a value of from 2/1 to 9/1, which comprises (I) adding together z molar parts of (A) a silane of the general formula SiZ$_4$, y molar parts of (B) a silane of the general formula R$^2$SiY$_3$ and either x molar parts of (C) a silane of the formula R$^3{}_a$R$_{3-a}$SiX or x/2 molar parts of (C') a disiloxane of the formula (R$^3{}_a$R$_{3-a}$Si)$_2$O in an aqueous medium, wherein R$^3$ is selected from the group consisting of hydrogen, olefinically and acetylenically unsaturated hydrocarbon substituents, chloropropyl, trifluoropropyl, organic substituents linked to silicon via a silicon-carbon bond and having oxygen present, organic substituents linked to silicon via a silicon-carbon bond and having sulfur present, organic substituents linked to silicon via a silicon-carbon bond and having oxygen and sulfur present, and organic substituents linked to silicon via a silicon-carbon bond and having oxygen and phosphorous present, R$^2$ denotes an R group or an R$^3$ group, X is selected from the group consisting of halogen atoms and alkoxy groups, Y is selected from the group consisting of halogen atoms, alkoxy groups, and groups of the general formula —OSiR$_3$, and Z denotes an alkoxy group, (II) allowing (A), (B) and (C) or (C') to react together in said aqueous medium, the medium having a pH below 7, and (III) optionally further reacting the finished resin, where said finished resin has Si-H groups, with a compound having olefinic unsaturation and N atoms in the presence of a hydrosilylation catalyst.

7. A method according to claim 6 wherein the aqueous medium is acidified by addition of a Broensted acid.

8. A method according to claim 7 wherein the acid is HCl.

9. A method according to claim 6 wherein Component (A) is tetraethoxysilane.

10. A method according to claim 6 wherein in Component (B) Y is selected from the group consisting of methoxy, chlorine and —Si(CH$_3$)$_3$.

11. A method according to claim 6 wherein a in Component (C) or (C') is 0.

12. A method according to claim 6 wherein substantially all R groups in Component (C) and (C') are methyl groups.

13. A method according to claim 6 wherein Component (C') is hexamethyldisiloxane.

14. A method according to claim 6 wherein an alcohol is added to the aqueous medium.

15. A method according to claim 14 wherein the alcohol is ethanol.

16. A method according to claim 6 wherein in step (I) Component (C) or (C') is dispersed in the aqueous phase before a mixture of Components (A) and (B) is added gradually.

17. A method according to claim 6 wherein step (II) is carried out at an elevated temperature.

* * * * *